March 17, 1959  A. GREINER ET AL  2,877,804
MACHINE FOR FORMING COILS
Filed Jan. 20, 1954  9 Sheets-Sheet 1
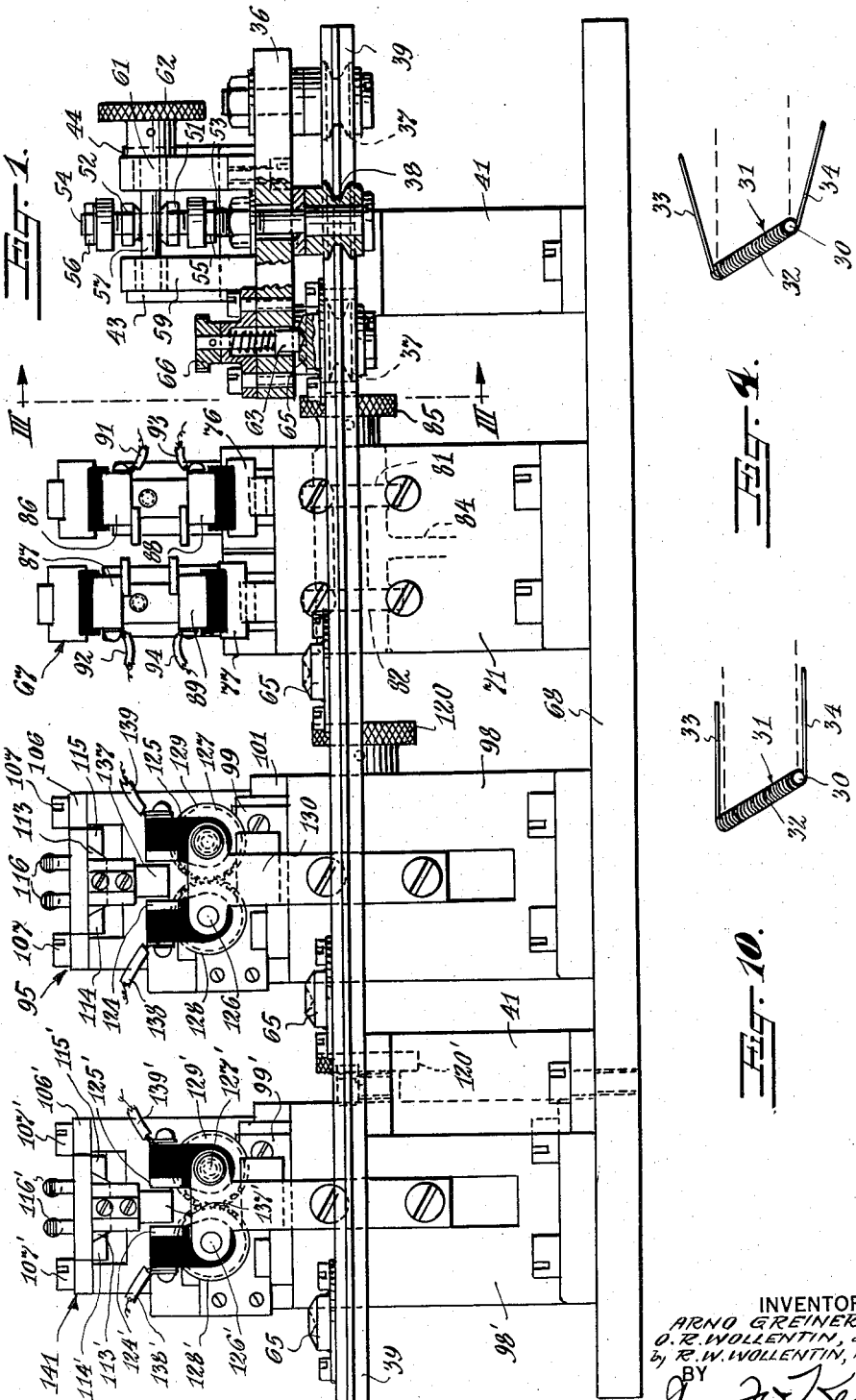
INVENTORS
ARNO GREINER and
O. R. WOLLENTIN, dec'd
by R. W. WOLLENTIN, ADMIN.
BY
ATTORNEY

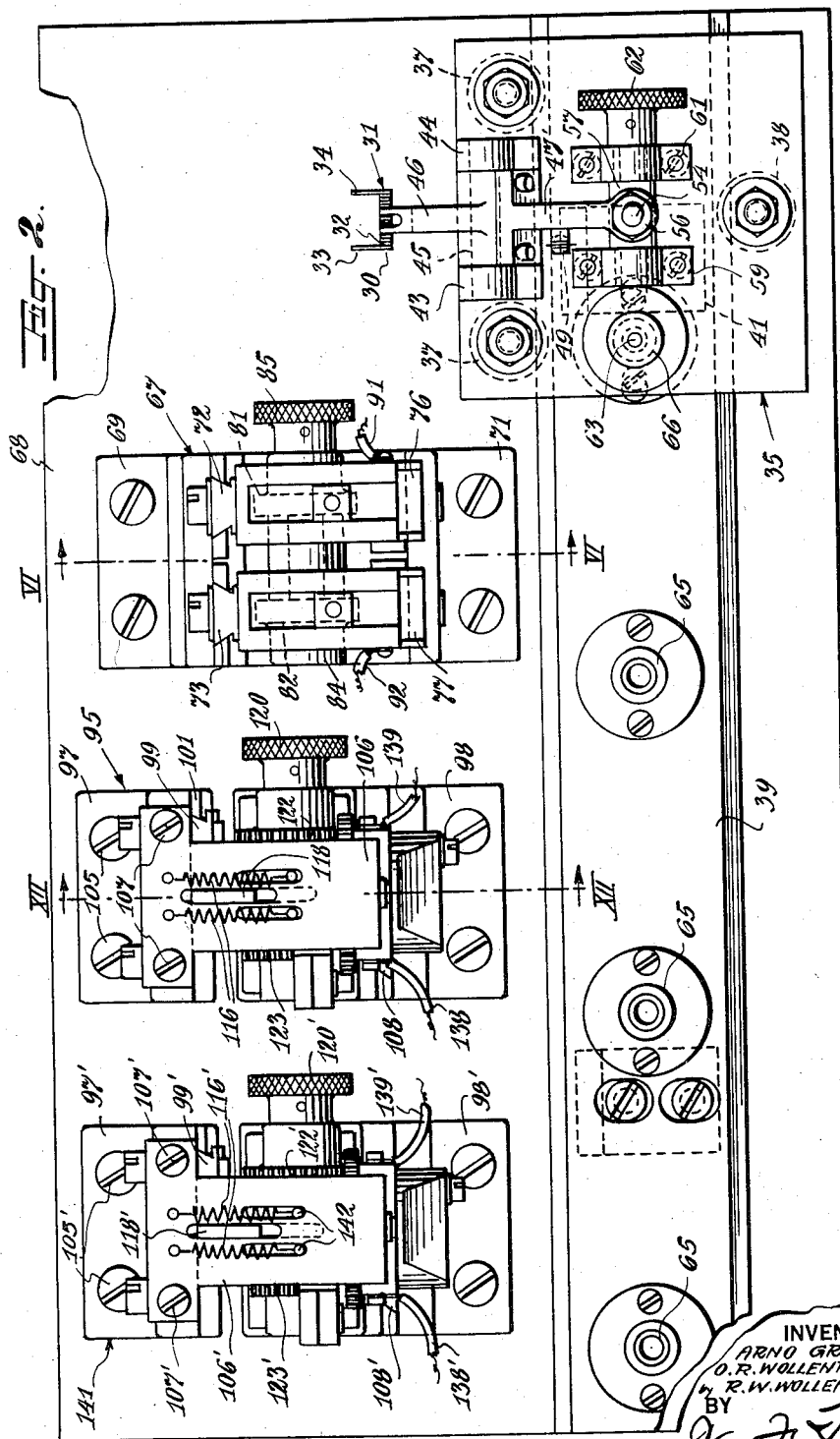

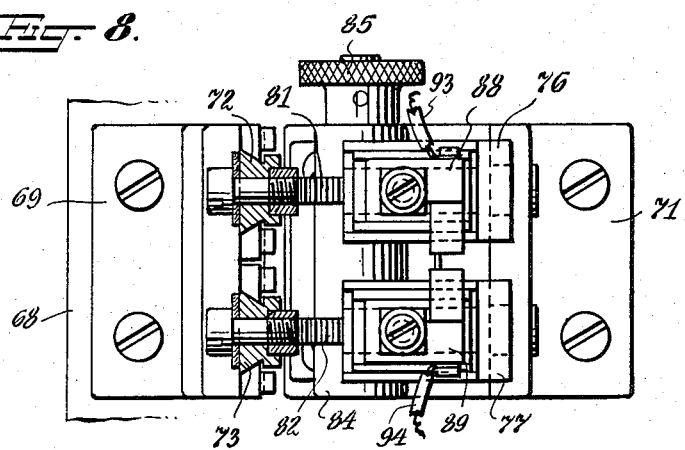
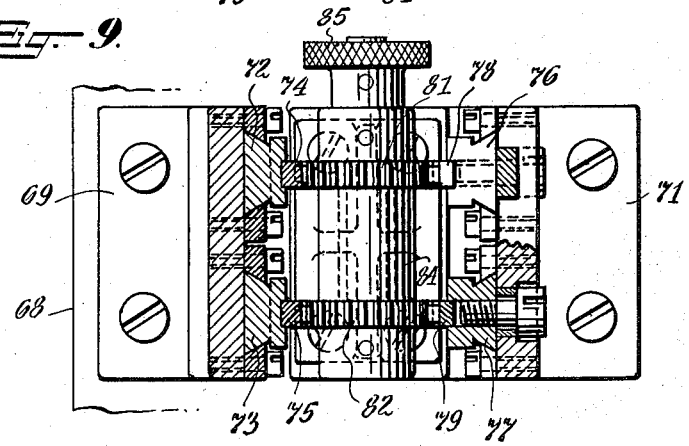
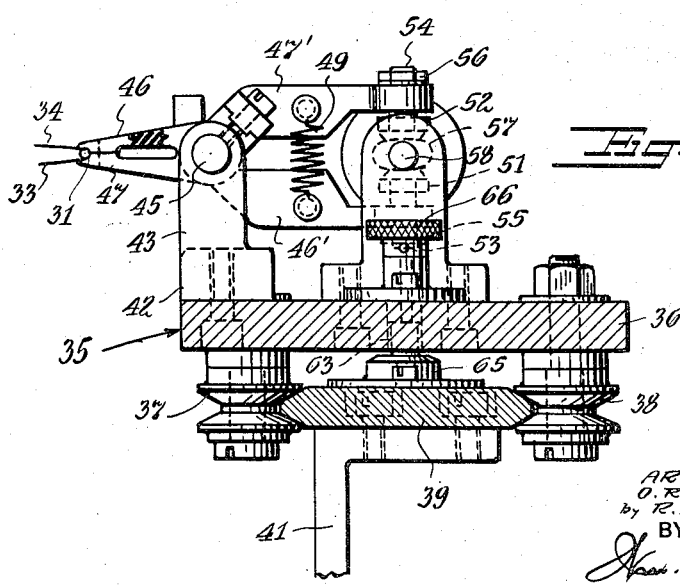

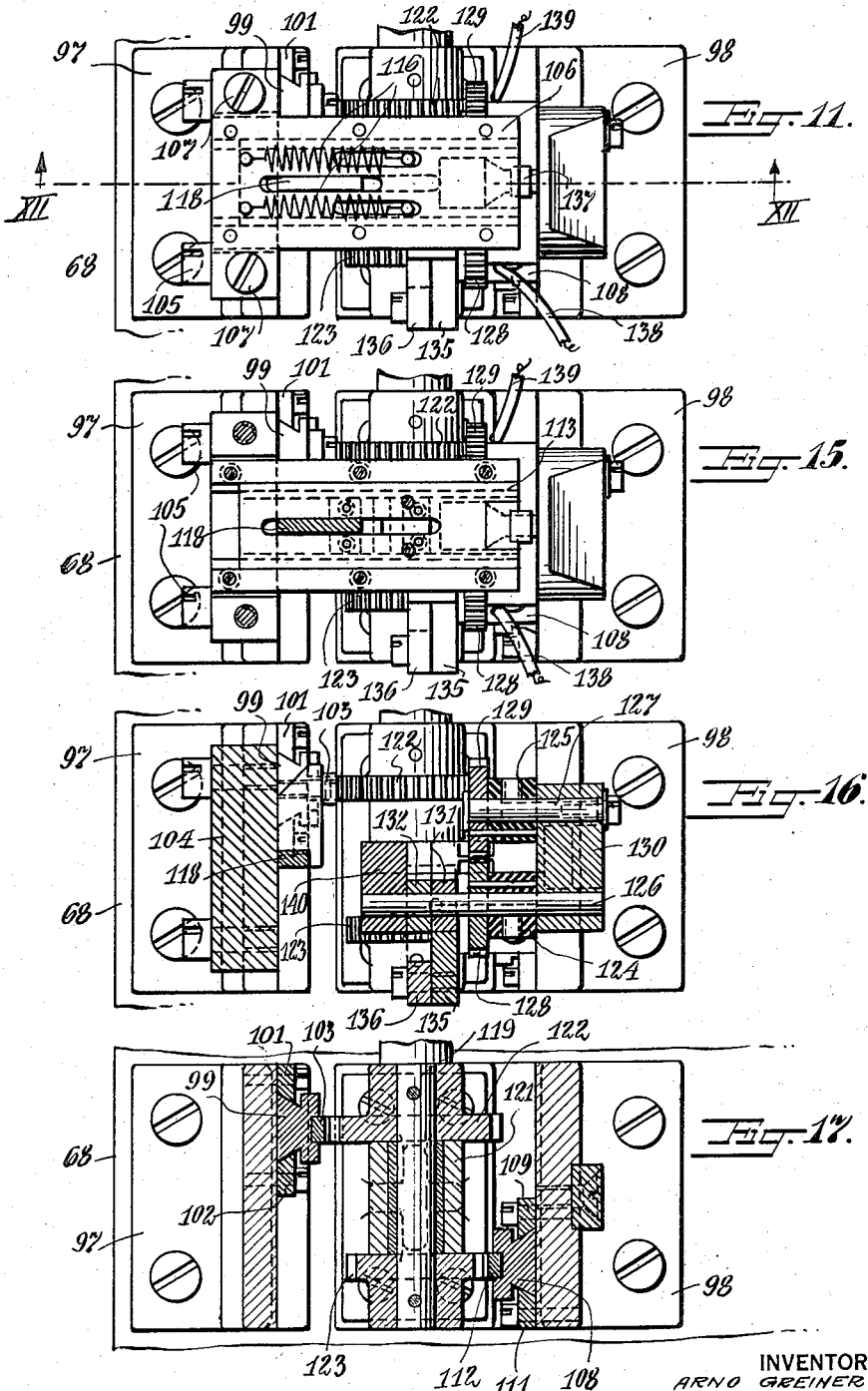

March 17, 1959 A. GREINER ET AL 2,877,804
MACHINE FOR FORMING COILS
Filed Jan. 20, 1954 9 Sheets-Sheet 6

INVENTORS
ARNO GREINER and
O. R. WOLLENTIN, dec'd
by R. W. WOLLENTIN, ADMIN.
BY
ATTORNEY March 17, 1959  A. GREINER ET AL  2,877,804
MACHINE FOR FORMING COILS
Filed Jan. 20, 1954  9 Sheets-Sheet 7
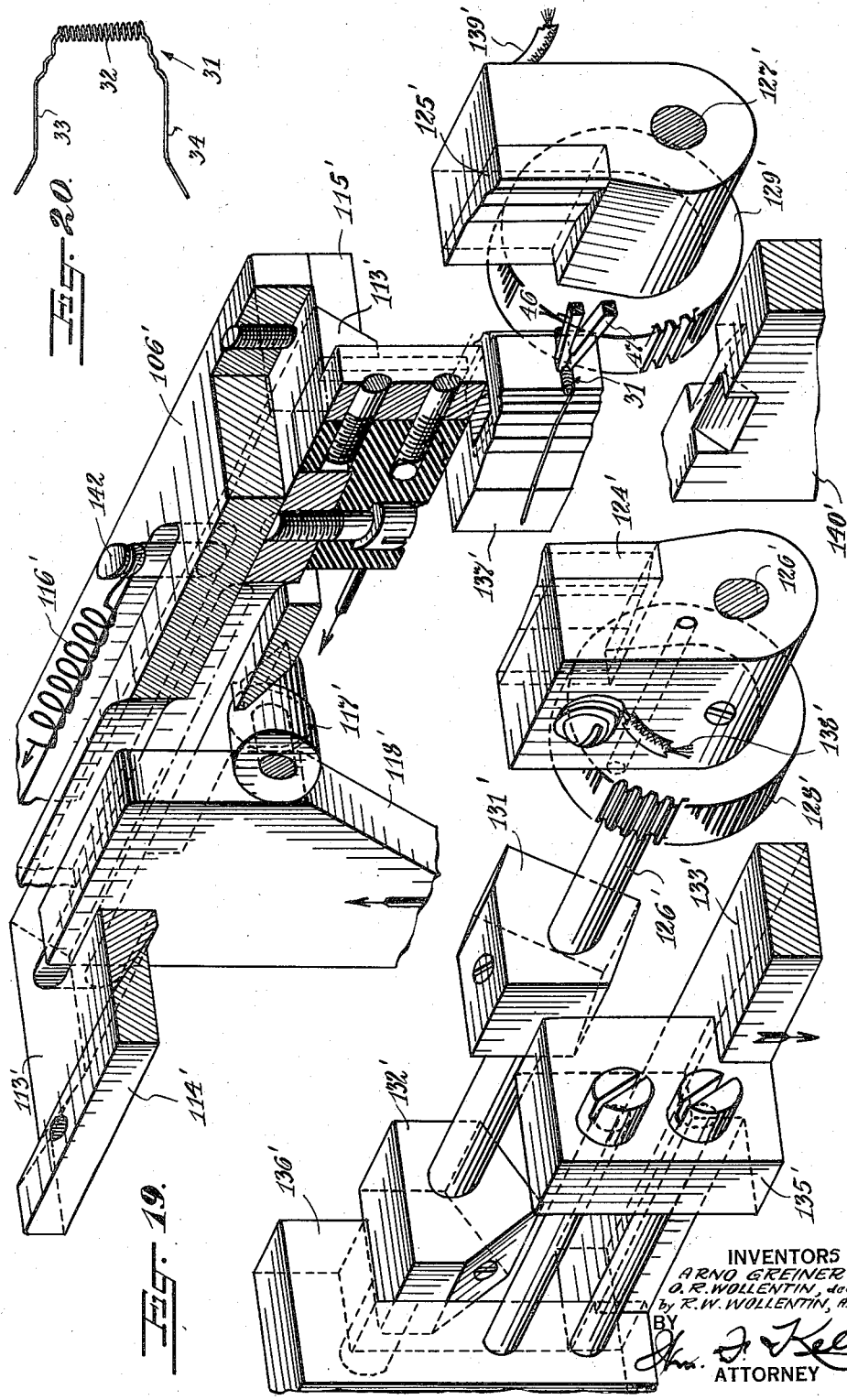
INVENTORS
ARNO GREINER and
O. R. WOLLENTIN, dec'd
by R. W. WOLLENTIN, ADMIN
BY
ATTORNEY March 17, 1959 A. GREINER ET AL 2,877,804
MACHINE FOR FORMING COILS
Filed Jan. 20, 1954 9 Sheets-Sheet 8

INVENTORS
ARNO GREINER and
O. R. WOLLENTIN, dec'd
BY R.W. WOLLENTIN, ADMIN.
ATTORNEY United States Patent Office 2,877,804
Patented Mar. 17, 1959

2,877,804

MACHINE FOR FORMING COILS

Arno Greiner, Irvington, and Otto R. Wollentin, deceased, late of East Keansburg, N. J., by Robert W. Wollentin, administrator, Bloomfield, N. J., assignors to Westinghouse Electric Corporation, East Pittsburgh, Pa., a corporation of Pennsylvania Application January 20, 1954, Serial No. 405,116

6 Claims. (Cl. 140—71)

This invention relates to apparatus for forming the leg sections of coils into shape desired to meet the requirements for automatic mounting devices, as used on some lamp-making machines.

An object of our invention, generally considered, is to provide a machine for bending and heating the leg sections of coiled filaments so as to set them in a shape desired to meet the requirements for automatic mounting devices.

Another object of our invention is to provide a coil leg-forming machine for heating and manipulating the legs of a coil into a required shape and position along planes vertical to the axis of the coil barrel, and then for heating and bending the legs into a required shape and position in a direction parallel to the axis of the coil barrel.

Other objects and advantages of the invention will become apparent as the description proceeds.

In the drawing:

Fig. 1 is a side elevational view, with parts in vertical longitudinal section, of an elementary device or prototype embodying our invention.

Fig. 2 is a plan of the device illustrated in Fig. 1.

Fig. 3 is a transverse sectional view on the line III—III of Fig. 1, in the direction of the arrows.

Fig. 4 is an enlarged perspective view of a coiled filament to be worked on, or as received by our machine prior to any working thereof.

Fig. 5 is an enlarged plan of a part of the machine, as illustrated in Fig. 2 except that the coil-holding unit has been moved to register with the first device to heat and manipulate the coil legs.

Fig. 6 is a transverse vertical sectional view on the lines VI—VI of Figs. 2 and 5, in the direction of the arrows.

Fig. 7 is a longitudinal vertical sectional view on the line VII—VII of Fig. 6, in the direction of the arrows.

Figs. 8 and 9 are respectively horizontal sectional views on the lines VIII—VIII and IX—IX of Fig. 6, in the direction of the arrows.

Fig. 10 is a view of the coil of Fig. 4, but showing it after the legs have been heated and bent in the manipulating devices of Figs. 5 to 9, incl.

Fig. 11 is a plan of the second leg manipulating device as shown in Fig. 12.

Fig. 12 is a transverse vertical sectional view on the lines XII—XII of Figs. 2 and 11, in the direction of the arrows.

Fig. 13 is a longitudinally sectional view on the line XIII—XIII of Fig. 12, in the direction of the arrows.

Figs. 14, 15, 16 and 17 are horizontally sectional views on the correspondingly numbered lines of Fig. 12, in the direction of the arrows.

Fig. 18 is a view of the coil of Fig. 10, but showing it after heating and bending in the device of Figs. 11 to 17, incl.

Fig. 19 is an exploded view on an enlarged scale of the third leg-manipulating device, which also appears at the extreme left in Figs. 1 and 2.

Fig. 20 is a view of the coil of Fig. 18, but showing it with its legs finally heated and bent in the device of Fig. 19.

Fig. 21 is a diagrammatic view to show variations in size which may occur in the barrel of coils handled in a machine embodying our invention.

Fig. 22 is a plan of an automatic rotary machine embodying the features of the preceding figures and connected to drive and heating apparatus.

Figure 23:
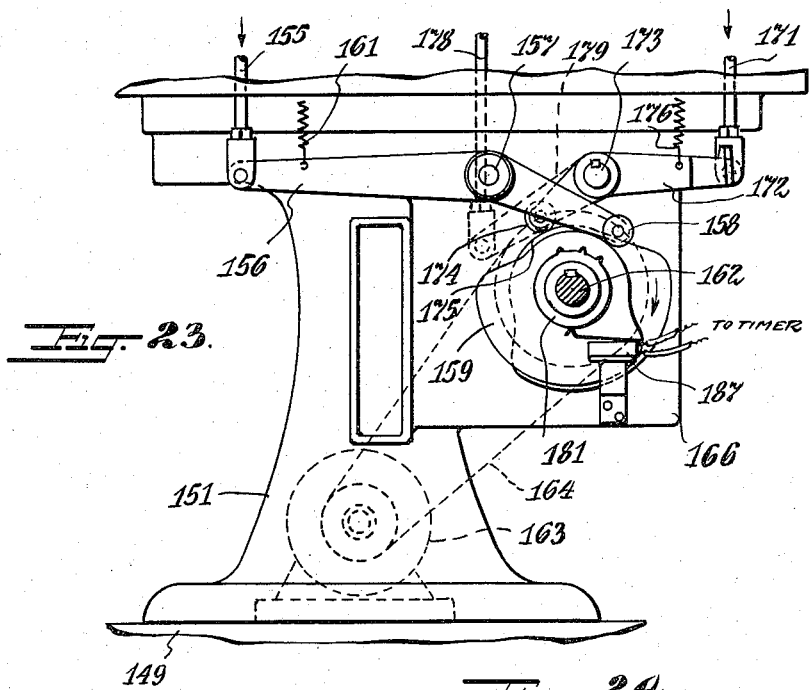
Fig. 23 is a vertically sectional view on the line XXIII—XXIII of Fig. 22, in the direction of the arrows.

The machine of the present application was developed as a means to form the leg sections of coils into certain shapes, to meet the requirements for automatic mounting devices as used in machines for manufacturing certain types of incandescent and other electric lamps.

Briefly, the device of the present invention comprises at least three units as follows:

(1) A coil holding or clamping unit.

(2) A device to bend or manipulate the legs of coils into a required shape and position, along planes vertical to the axis of the coil barrel, while heating said legs to set the metal.

(3) A device to bend or manipulate the partially-bent legs of such coils into a required shape and position, in a direction parallel to the axis of the coil barrel, while applying heat to said legs to set the metal thereof.

It may also in some instances be desirable to have another device to further work the legs of the coils, such other device being similar to the last-mentioned device, except that the bending blocks or forming members, including an intermediate anvil, have correspondingly altered forming faces.

The coil holding or clamping unit consists of two jaws or finger elements pivoted on a common axis, similar to scissor-blades, held in normally-closed position by a spring, and equipped with adjusting means for the required positioning. The jaws when closed provide at their clamping ends a cylindrical cavity, corresponding in diameter with that of the coil barrel, thus being capable of holding the coil quite firmly. A cam is disposed between or straddled by the extended handles of the jaws, or those portions extending beyond, or on the other side of the axis from the cylindrical cavity, and means are provided to operate said cam to effect the desired jaw opening and closing.

The first leg-former or manipulator involves vertically movable blocks or anvils which apply pressure to the coil legs in planes perpendicular to the axis of the coil barrel. It consists of four members slidable in suitable brackets and flanked by gibs. These members are vertically reciprocable by means of a rack carried by each one and engaged by the teeth of two pinions, two racks located on opposite sides of each pinion. When the pinions are rotated, the opposed racks will move in opposite directions. The slides to which the racks are attached are equipped with forming blocks or anvils, which like the slides always move in directions opposite to cooperating blocks like the opening and closing of two sets of jaws. These two sets of jaws are supplied with electrical current to apply heat to the legs during forming to effect setting of the metal thereof. When the jaws arrive at their closed position, the legs of the coil being operated on are bent between them and electrical current is passed therethrough to apply the desired heat.

After the legs have been bent by the aforementioned movement of the jaws, they pass to a second leg former which acts on them in the opposite direction, that is, parallel to the axis of the coil barrel. This device consists of two slides vertically movable in opposed brackets by means of a rack carried by each slide and engaged by the teeth of two pinions carried on a single shaft between said racks. When the pinions are rotated, the racks will move vertically in opposite directions. One of the brackets, designated number one, is provided with a horizontal top shelf portion extending toward and at an elevation higher than the top of bracket number two. A third slide member is mounted in the top shelf portion for horizontal reciprocation toward and away from bracket number two.

There are two pinions, one disposed in engagement with one rack and the other in engagement with the other rack. A shaft is provided on which said pinions are mounted for turning them about a common axis. Power means may be provided for turning the pinions to move the racks and slide the carrying members in opposite directions. A cam is carried by the upper portion of the member vertically slidable in bracket number one. Said cam engages a portion of the third slide member to move it to position over the slide member in bracket number two. Spring biasing means are provided to normally hold the third slide member in a position over the bracket number one slide and in engagement with the cam carried thereby.

Forming blocks or anvils are provided, one carried on and swingable by each of two horizontal shafts disposed below and parallel to the line of movement of the third slide member. Pinions are provided on these shafts in engagement with one another, to cause said shafts to simultaneously turn in opposite directions. The blocks carried by the shafts are turned to, when in closed position, shape the coil legs against an anvil or intermediate block which is carried, and moved therebetween, by the third slide member. The coil legs are in this device further formed between the swinging blocks and the reciprocable anvil therebetween while current is passed therethrough to set them in formed position.

In some instances another forming device, like the one just described but having differently formed cooperating blocks and an anvil with engaging faces differently formed, so as to put another bend or otherwise manipulate the partially-formed legs of each coil after reception therein, may be employed.

We will now proceed to describe, first the elements of our coil-forming mechanism, and then disclose how these elements are combined with a conveyor which automatically feeds coils at one place and removes them at another place, after the legs thereof have been shaped in accordance with requirements.

Referring to the drawing in detail and first considering the embodiment of Figs. 1 to 20, incl., there is shown in Fig. 4, a coil 31 as initially manufactured and the legs of which are to be shaped accurately for machine handling. As will be seen, this coil comprises a body portion or hollow coiled barrel 32, from which legs 33 and 34 extend at the ends. These legs, however, do not initially extend generally parallel to one another, as is desired, nor do they otherwise have the configuration which is needed. We will first describe the individual elements or devices which operate on such coils, while containing mandrels 30 to prevent crushing by the holding jaws. These devices in themselves are not entirely automatic. Later in the specification, we will describe how these devices are assembled in order to provide a fully automatic machine which receives coils, such as illustrated in Fig. 4, and discharges them after being formed as desired, and as illustrated in Fig. 20, for example.

The coil holding or clamping unit

The coil holding or clamping unit, generally designated 35, is illustrated in Figs. 1, 2, 3, 5, 6, 12 and 19, although some of these figures illustrate only small portions thereof. As shown most clearly at the right hand ends of Figs. 1 and 2 and in Fig. 3, this unit comprises essentially a base 36, here shown carrying flanged pivotally mounted rollers 37 and 38 which supportingly engage opposite edges of a rail 39, carried on a frame member 41. Upstanding from the base 36 is a bracket 42 with upright standards 43 and 44, between which a pivot pin 45 extends. This pin carries cooperating jaws 46 and 47 forming a clamping device. The left hand ends of these jaws, as viewed in Fig. 3, form when closed a cylindrical pocket 48 adapted to tightly receive a coil barrel 32 which contains a mandrel 30 which prevents undesired distortion or collapse.

The jaws 46 and 47 extend rearwardly or beyond the pivot pin 45, as indicated at 46' and 47'. These extensions are biased to closed position by a coil spring 49, the ends of which are operatively connected thereto, whereby the jaws 46 and 47 tend to remain closed. The end portions of the extensions 46' and 47' carry abutments 51 and 52, adjustably mounted therein as by means of threaded extensions 53 and 54 and lock nuts 55 and 56. Between these abutments is disposed an operating cam 57, rotatably mounted for movement with a shaft 58, and ends of which are journalled in bearing brackets 59 and 61. A knurled handle 62 or other operating means is fixed on one end of the shaft 58 for operating the same to cause the jaws 46 and 47 to open and close as desired.

In the present embodiment, a downwardly-spring-biased set pin 63 is vertically movable in the base 36 and the lower end of which is receivable in one of several keepers 65 positioned along the rail 39 so as to hold the clamping unit in a desired position thereon, that is, in registry with one or the other of the cooperating devices which will now be described. Release of the member 63 from the keeper 65 is effected by pulling up on the knurled head 66.

Device to bend the coil legs along planes perpendicular to the axis of the barrel The first device which bends the coil legs when held as viewed in Figs. 2 and 3, is generally designated 67 and shown most clearly in Figs. 1, 2, 5, 6, 7, 8 and 9. It comprises a base 68 from which upstand brackets 69 and 71. Slide members 72 and 73, tapered in cross-section and flanked by gibs, are vertically movable in bracket 69 and carry racks 74 and 75. Likewise, the bracket 71 carries similarly flanked slide members 76 and 77, which in turn carry racks 78 and 79. Two pinions, 81 and 82, are disposed between the racks of the respective brackets. Pinion 81 is disposed between and meshes with racks 74 and 78, and pinion 82 is disposed between and meshes with racks 75 and 79.

A shaft 83 held by a bracket 84 upstanding from a lower flange of the bracket 71, serves to hold the pinions 81 and 82 and cause them to move simultaneously with one another. Operating means are provided for the shaft, in the present instance indicated as a knurled member 85 secured to an end of said shaft. The slidable members 72, 73, 76 and 77 respectively carry coil-leg-forming members, or leg shaping blocks, 86, 87, 88 and 89, respectively insulated therefrom and connected, as by means of leads 91, 92, 93 and 94 to a source of electrical energy.

These blocks, as illustrated most clearly in Fig. 6, are adapted to respectively overlie and underlie the legs 33 and 34 of a coil when held in jaws 46 and 47, so that when said forming blocks are brought together by turning the shaft 83 in a counter-clockwise direction as viewed in Fig. 6, and electrical power applied to the blocks, the legs of a coil are bent and set so that after release the coil has the form illustrated in Fig. 10, that is, the legs 33 and 34 have been bent so that they lie parallel to one another and approximately tangent to the coil barrel 32. Because of this relationship the leg at one end of the coil is engaged at a different level from that at the other, as will be noted particularly in Figs. 6 and 7.

Device to bend the coils legs parallel to the axis of the barrel

The second device which bends the coil legs when held as in Figures 2 and 3, and after transference from the device of Figs. 1, 2, 5 6, 7, 8 and 9, is generally designated 95 and shown most clearly in Figs. 1, 2 and 11 to 17, incl. It comprises base 68 from which upstand brackets 97 and 98. A slide member 99, tapered in cross section and flanked by gibs 101 and 102, is vertically movable in bracket 97 and carries a rack 103. This bracket, which we call number one, has a top element 104 secured thereto as by means of screws 105. Projecting from the top of this element 104 is a horizontal top shelf portion 106. It is fastened to the member 104 by means of screws 107. This shelf portion 106 extends toward and at an elevation higher than that of the bracket 98, which we call number two.

Number two bracket also carries a slide member 108 flanked by gibs 109 and 111 and carrying a rack 112. A third slide member 113, flanked by gibs 114 and 115, is movable horizontally in the top shelf portion 106, to and from bracket number two. This slide member is biased toward bracket number one by coil springs 116, the ends of which are operatively connected respectively to the slide member 113 and the shelf 106. The slide member 113 carries a rotatably mounted roller 117, which is held in engagement with a cam 118 carried by the slide member 99, so that upon vertical reciprocation of the latter the slide member 113 moves back and forth as desired.

A shaft 119, journalled in a bracket 121 upstanding from a lower flange of the bracket 98, serves to hold and operate pinions 122 and 123. The former of these pinions meshes with the rack 103, and the latter of which meshes with the rack 112. Upon turning the shaft 119, as by means of the knurled handle 120 or other operating means, the slide members 99 and 108 simultaneously reciprocate but in opposite directions, while the slide member 113 reciprocates horizontally thereabove.

There are provided coil leg forming blocks 124 and 125, the former carried by, but insulated from, a horizontal shaft 126 and the latter carried by, but insulated from, a shaft 127, also horizontal and parallel to the shaft 126, disposed at the same elevation, and journalled in an extension 130 of the bracket 98, secured to the latter as by screws. The inner, or left hand end of the shaft 126 is journalled in the upstanding end portion of a member 140 extending horizontally from the part 130 and secured to the latter as by screws 150. The block 124 has fastened thereto a pinion 128, and the block 125 has fastened thereto a pinion 129 meshing with the pinion 128, so that said blocks may be simultaneously rotated but in opposite directions. The carrying shaft 126, to which the block 124 is fastened, has also secured thereto follower cams 131 and 132 for causing the desired movement of the forming blocks.

Slide member 108 carries a transverse extension 133 at its top, secured thereto as by means of a screw 134. This extension 133, in turn, carries drive cams 135 and 136, the former of which, upon upward movement of the slide member 108, engages the cam 131, turns it clockwise, as viewed in Fig. 13, and at the end of its upward travel lies alongside of said cam and locks it and the blocks 124 and 125 in closed position. The cam 136 acts upon downward movement of the slide member 108, upon release of the cam 135, to engage the top of cam 132 and turn the shaft 126 counter-clockwise, as viewed in Fig. 13, its side face lying close to the then side face of the cam 132, to lock the shaft 126 and the parts carried thereby in open position.

As the forming blocks 124 and 125 come together to the position of Fig. 13, an anvil or intermediate block 137, carried by and depending from the slide member 113, is moved to the right, as viewed in Fig. 12, by action of the cam 118, to a position between the blocks 124 and 125. This occurs as the slide member 99 is moved downward, while the slide member 108 moves upward, upon operation of the pinions 122 and 123 in a counter-clockwise direction, as viewed in Fig. 12, by turning of the knurled handle 120 or other operating means. When this occurs, the legs of a coil being respectively disposed between the anvil block 137, the block 124 on one side, and the block 125 on the other, electrical current is passed through all of said blocks and said legs by lead-in conductors 138 and 139 extending from a suitable source of electrical power, thereby forming the coil legs to the shape illustrated in Fig. 18.

Device to further bend the coil legs parallel to the axis of the barrel

The third device which may be employed to make additional bends in the coil legs, when held as in Figs. 2 and 3, and after transference from the device 95, is generally designated 141 and shown most clearly in Figs. 1, 2 and 19, supplemented by corresponding portions of said device 95 as shown most clearly in Figs. 11 to 17, incl. In other words, it may comprise part of the same base 68 from which upstand brackets 97' and 98'.

A slide member 99', tapered in cross section and flanked by gibs like the member 99, is vertically movable in bracket 97' and carries a rack (not shown) but like the rack 103. This bracket, which we call number three, has a top element, like the element 104 of device 95, secured thereto as by means of screws 105'. Projecting from the top of this element is a horizontal top shelf portion 106'. The latter is fastened to the member from which it extends, as by means of screws 107'. This shelf portion 106' extends toward and at an elevation higher than that of the bracket 98', which we call number four.

Number four bracket also carries a slide member 108' flanked by gibs and carrying a rack like in the device 95. A third slide member 113', flanked by gibs 114' and 115', is movable horizontally in the top shelf portion 106' to and from bracket number four. This slide member is biased toward bracket number three by coil springs 116', the ends of which are operatively connected respectively to the slide member 113', as to posts 142 upstanding through and to the shelf 106'. The slide member 113' has a roller 117', pivotally mounted thereon and held in engagement with a sam 118' carried by the slide member 99', so that upon vertical reciprocation of the latter, the slide member 113' moves back and forth as desired.

The device 141 also includes a shaft (not shown) like the shaft 119 of the device 95, journalled in a bracket (like 121) upstanding from a lower flange of the bracket 98', and serving to hold and operate pinions 122' and 123'. The former of these pinions meshes with the rack on the slide member 99' and the latter meshes with the rack on the slide member 108'. Upon turning the pinion-carrying shaft, as by means of the knurled handle 120' or other operating means, the slide members 99' and 108' simultaneously reciprocate vertically, but in opposite directions, while the slide member 113' reciprocates horizontally thereabove.

There are provided coil leg forming blocks 124' and 125', the former carried by but insulated from a horizontal shaft 126' and the latter carried by but insulated from a shaft 127', also horizontal and parallel to the shaft 126', disposed at the same elevation, and journalled in an extension of the bracket 98', as in the device 95. The block 124' has fastened thereto a pinion 128', and the block 125' has fastened thereto a pinion 129', normally meshing with the pinion 128' but shown separated therefrom in Fig. 19 because this figure is an exploded view. Thus, these blocks may be simultaneously rotated but in opposite directions. The carrying shaft 126' for the block 124' has also secured thereto follower cams 131' and 132' for causing the desired movement of the forming blocks.

Slide member 108' carries a transverse extension 133' at its top, like the member 108 of the device 95. This extension 133', in turn, carries drive cams 135' and 136', the former of which, upon upward movement of the slide member 108', engages the cam 131'; turns it clockwise as viewed in Fig. 19, and at the end of its upward travel lies alongside of said cam and locks it and the blocks 124' and 125' in closed position. The cam 136' acts upon downward movement of the slide member 108', upon release of the cam 135', to engage the top of cam 132' and turn the shaft 126' counter-clockwise, as viewed in Fig. 19, its side face lying close to the side face of the cam 132', to lock the shaft 126' and the parts carried thereby in open position.

The forming blocks 124' and 125' are generally like the blocks 124 and 125 of the device 95, except that their forming faces are of a different configuration so as to bend the legs of coils, initially shaped as illustrated in Fig. 18 to the configuration illustrated in Fig. 20. As these blocks come together to the position shown at the left hand end of Fig. 1, an anvil or intermediate block 137', carried by and depending from the slide member 113', is moved to the right as viewed in Fig. 19 by action of the cam 118', to a position between the blocks 124' and 125'. This anvil block is like the block 137 of the preceding embodiment, except that its forming faces are changed to correspond with the forming faces of the blocks 124' and 125'.

It will also be understood that these blocks 124' and 125' are close to the block 137' therebetween in a forming position, so as to bend the legs 33 and 34 of the coil 31, there shown. These blocks are, however, shown separated in the exploded view of Fig. 19. This movement of the anvil block 137' occurs as the slide member 99' moves downward and the slide member 108' moves upward, upon operation of the pinions 122' and 123' in a counter-clockwise direction, as viewed from the right of Figures 1 and 2, by turning the knurled handle 120' or other operating means. When this occurs, the legs of a coil being respectively disposed between the anvil block 137', the block 124' on one side, and the block 125' on the other, electrical current is passed through all of said blocks and the legs therebetween by lead-in conductors 138' and 139' extending from a suitable source of electrical power, thereby forming the coil legs to the shape illustrated in Fig. 20.

From the foregoing, it will be seen that the machine of Figs. 1, 2, 3, 5 to 9, incl., 11 to 17, incl. and 19, is adapted to form coils, starting with one shaped as shown in Fig. 4, through the stages illustrated in Figs. 10 and 18, to a shape as shown in Fig. 20. A coil is started by placing it in the clamping unit 35, moving said unit from the position illustrated in Figs. 1 and 2 to register with the coil bending device 67, as viewed in Figs. 5 and 6, where the coil legs are formed to the shape illustrated in Fig. 10. The device 35 then carries the coil to register with the device 95, as shown in Figs. 12 and 14, where the coil legs are then shaped to the form illustrated in Fig. 18. The device 35 then carries the coil to register with the device 141, as illustrated in Fig. 19, where the coil legs are finally shaped to the form illustrated in Fig. 20.

It will be understood that the foregoing is a mere description of the operation of prototypes or elements of our coil-bending machine which, as illustrated in Figs. 22 and 23, are desirably combined with a rotary conveyor, loading and unloading mechanism, mechanism for automatically indexing said conveyor, and the coil holding devices thereon, with the bending devices, and the electrical heating mechanism.

Fig. 21 is to show that a machine embodying our invention may handle coils in which the legs are equally spaced, or lie in parallel planes equally spaced from the axis of the coil barrel, whether or not the barrel is large as indicated at $32^a$, medium size as illustrated in $32^b$ so that the coils come out tangent to the barrel, or small as in $32^c$ so that the legs are offset outwardly to the uniform dimension in all cases designated as α, which in one embodiment, may be .053".

*The automatic conveyor device of Figures 22 and 23*

Referring now to the embodiment of our invention illustrated in Figs. 22 and 23, there is shown a rotary conveyor 143 so constructed that it automatically carries coils from a loading device 144, which feeds said coils to one of the several coil holding devices 35, automatically opened by a stationary cam 146, secured to and disposed about the periphery of the conveyor, and transports said coils with their legs outstanding to be bent successively by devices 67, 95 and 141, distributed at stations around the conveyor, after which each of the coil-holding devices 35 is automatically opened at the unloading station 145, as by means of a similar stationary cam 146', to discharge the coils one by one onto an unloading chute 147, from whence they may flow to a power-operated conveyor belt 148.

The rotary conveyor, generally designated 143, comprises a base or foundation 149 on which is mounted a pedestal 151. Supported on said pedestal is a generally-circular platform member 152, serving as a support for a series of coil-holding or clamping units 35, corresponding in form and operation with these units already described in the preceding figures. However, here instead of said units being operated by a knurled handle, there is a lever 153 attached to the cam shaft 58 and operated by the stationary cam 146, so as to hold the jaws 46 and 47 open at the loading position, station No. "1," and operated by the stationary cam 146' at the unloading position, station No. "12." Any suitable loading mechanism 144 may feed the coils to the open jaws 46 and 47 which thereafter automatically close and carry the coils through stations Nos. "2" to "12," incl. At the last station "12" the jaws are again automatically opened to allow the coils to drop upon the unloading chute 147.

*Operation*

After a coil is loaded at station No. "1," it is carried to, in this embodiment, station No. "3" where its legs are bent by a device such as designated 67 and previously described. However, in the present embodiment such device, instead of being operated manually by turning a knurled handle 85 as in the previous description, here has instead a crank 154 on its shaft 83, the free end of which is pivoted to a connecting rod 155. The lower end of said rod 155 is connected to the left hand end of the lever 156, as viewed in Fig. 23. The lever 156 is pivoted to the pedestal 151 of the machine, as indicated at 157 and at its other end carries a roller 158 held in engagement with an operating cam 159, as by means of a biasing spring 161, the lower end only of which is illustrated.

This cam 159 is carried by a shaft 162 driven by a motor or other prime mover 163 as by means of a belt or other drive means 164. The shaft 162 also drives a conveyor indexing shaft 165 through suitable gears in a gear box 166. The lower portion of the conveyor table 152 carries a series of rollers 167 pivotally mounted and received in the thread of a worm 168 on the shaft 165, so that as the worm turns one revolution it moves the conveyor from one station to the next. Said worm is so shaped that the conveyor is held stationary for a desired interval during each leg-forming operation and then moved onto the next station on continuous turning of the worm. This kind of step-by-step drive mechanism is old and the Green Patent No. 2,569,852, dated October 2, 1951, is referred to for further details.

After a coil has had its legs bent in the device 67 at station No. "3," it is finally indexed at station No. "6" where its legs are similarly bent in a device like that designated 95 and previously described. However, in the present embodiment, said device 95, instead of being operated manually by turning a knurled handle 120 as in the previous description, here has instead a crank 169 on its shaft 119, the free end of which is pivoted to a connecting rod 171. The lower end of said rod 171 is connected to the right hand end of a lever 172, as viewed in Fig. 23. The lever 172 is pivoted to the pedestal 151 of the machine by a shaft 173 to which it is fixed. Its other end carries a roller 174 held in engagement with an operating cam 175 as by means of a biasing spring 176, the lower end only of which is illustrated.

After the coil has its legs bent at station No. "6," it eventually is indexed at station No. "9," where its legs are bent by a device such as designated 141 and previously described. However, in the present embodiment such device, instead of being operated manually by turning a knurled handle 120', as in the previous description, here has instead a crank 177, the free end of which is pivoted to a connecting rod 178. The lower end of said connecting rod 178 is pivoted to the left hand end of a crank 179 fixed on the same shaft 173 as the lever 172, so as to be operated by the same cam 175; see Fig. 23.

After having its legs finally bent at station No. "9," the coil is eventually indexed at station No. "12" and discharged from the machine by operation of the cam 146' to release the coil-holding jaws 46 and 47, said coil being then in finished condition.

Figure 24:
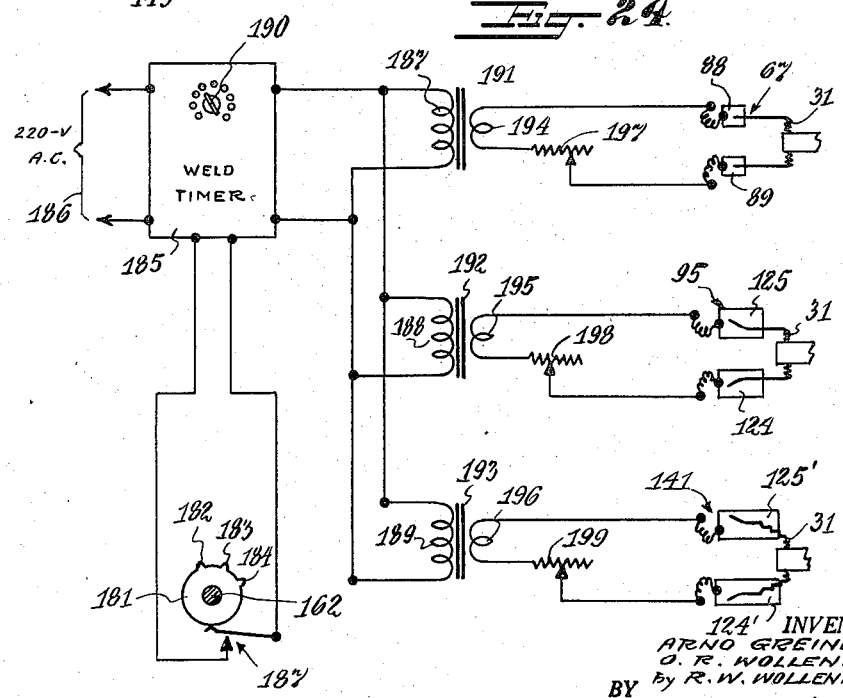
Fig. 24 is a wiring diagram of the apparatus of Figs. 22 and 23.

Although in the foregoing description no mention has been made of the specific operation of the heating current, it will be understood that this heating operation occurs as previously first described in connection with the individual devices 67, 95 and 141. The wiring diagram for such heating by means of electrical current is shown in Fig. 24, where 181 represents a cam which is secured on the shaft 162 (see Fig. 23). In the present embodiment cam 181 contains three high dwells 182, 183 and 184 which sequentially close the circuit of the weld-timer 185, supplied from a suitable source 186 of preferably 220 volts alternating current.

This means that, as the cam 181 rotates, the switch 187 is closed three times during each indexing operation to give three surges of current to the forming blocks of the respective machines; 86, 87, 88 and 89 of the device 67; 124 and 125 of device 95, and 124' and 125' of device 141; to allow current to pass from the timer 185, suitably controlled by handle 190, through the corresponding primary windings 187, 188 and 189 of transformers 191, 192 and 193, so that current generated in the respective secondary windings 194, 195 and 196, passes through the corresponding circuits respectively controlled by rheostats 197, 198 and 199 to, while the coils are indexed at the respective devices 67, 95 and 141, apply the desired number of pulses of current of the adjusted intensity to the corresponding leg-forming blocks of said devices.

Although in the present embodiment, we have shown leg-forming devices at only three stations of a twelve head conveyor with the remaining heads idle for cooling purposes, it will be understood that we do not wish to be limited to this construction, as the number of heads may be reduced, the number of leg-forming stations increased, with the corresponding reduction in the number of cooling stations therebetween, or certain coils may have their legs formed in only two or less than three of the devices, here designated 67, 95 and 141, in accordance with requirements. It will also be understood that the coils of any of the shapes of Fig. 21, in which the barrels are respectively designated $32^a$, $32^b$ and $32^c$, may have their legs shaped in a machine embodying our invention. It will be further understood that the number of impulses, here shown as three, may be varied, as desired, and the settings of the timer 185 and the rheostats 197, 198 and 199 may be appropriately adjusted to accomplish the results desired.

Although preferred embodiments have been disclosed, it will be understood that modifications may be made within the spirit and scope of our invention.

We claim:

1. A leg former mechanism for heating and forming the legs extending from the barrel portion of a coil, by manipulating said legs in planes perpendicular to the axis of the coil barrel, comprising a base, brackets upstanding therefrom, for slide members as two opposed pairs mounted for vertical reciprocation with respect to said brackets, a rack carried by each of said slide members, two pinions, one disposed between the racks of each of the opposed pairs of slides, the teeth of said pinions engaging the respective racks, a shaft mounting said pinions for turning about a common axis, means for turning said pinions to move said racks and slide them in opposite directions, forming blocks carred by said sliding members, adapted to respectively overlie and underlie the legs of a coil to be formed, and movable to and from engagement with said legs, and means for supplying electrical heating current from said blocks to pass through said legs and coil, when the blocks are together about said legs, in order to heat the latter to a setting temperature when formed by said blocks.

2. A leg former mechanism for heating and forming the legs extending from the barrel portion of a coil, by manipulating said legs in a direction parallel to the axis of the coil barrel, comprising a base, brackets numbers one and two upstanding therefrom, a slide member mounted for vertical reciprocation in each bracket, bracket number one having a horizontal top shelf portion extending toward and at an elevation higher than bracket number two, a third slide member mounted in said top shelf portion for horizontal reciprocation toward and away from bracket number two, a rack carried by each of the two first-mentioned slide members, two pinions, one disposed in engagement with one rack and the other in engagement with the other rack, a shaft on which said pinions are mounted for turning about a common axis, means for turning said pinions to move said racks and slide them in opposite directions, a cam carried by the upper portion of the member vertically slidable in bracket number one and engaging a portion of the third slide member to move it to position over the slide member in bracket number two, spring means biasing said third slide member to a position over the bracket number one slide and into engagement with said cam, forming blocks one carried on each of two horizontal shafts disposed below and parallel to the line of movement of the third slide member, pinions on said shafts in engagement with one another to cause them to simultaneously turn in opposite directions, forming blocks carried by said last-mentioned shafts and movable therewith to shape the coil legs when in close position, means for operating said forming-block-carrying shafts comprising cams carried by the slide of bracket number two and engaging cams on one of the forming block carrying shafts for turning the latter and moving said forming blocks toward and away from one another, an intermediate forming block carried by the third slide member and caused by the pinion-cam connection to move to a position between said forming blocks as they come together, to thereby horizontally bend the coil legs, which respectively lie between the intermediate block and those on opposite sides thereof, into a desired configuration, and means for applying electrical heating current from said forming blocks through said legs and coil when said blocks are together about said legs, in order to heat the latter to a setting temperature when formed by said blocks.

3. Apparatus for uniformly bending the legs of a coiled filament which extends from the central barrel portions thereof, at angles to the barrel axis, to adapt said filament for use in automatic mounting machines, comprising the combination of a head to hold said filament and carry it along a definite path to a plurality of work stations; a coil feeding mechanism at one of said work stations for feeding such filaments one by one to a head, so that the barrel thereof is gripped and the legs project outwardly therefrom; a first leg former mechanism at a succeeding work station for bending while heating the legs of a coil held by a head into a required shape and position, in planes vertical to the axis of the coil barrel, said first leg former mechanism comprising a base, brackets upstanding therefrom, four slide members as two opposed pairs mounted for vertical reciprocation with respect to said brackets, a rack carried by each of said slide members, two pinions, one disposed between the racks of each of the pairs of slides, the teeth of said pinions engaging the respective racks, a shaft mounting said pinions for turning about a common axis, means for turning said pinions to move said racks and slide them in opposite directions, forming blocks carried by said sliding members adapted to respectively overlie and underlie the legs of a coil to be formed and movable to and from engagement with said legs, and means for supplying electrical heating current to said blocks to pass through said legs and coil, when the blocks are together about said legs, in order to heat the latter to a setting temperature when formed by said blocks; a second leg former mechanism at another work station for manipulating the legs into a required shape and position in directions parallel to the axis of the coil barrel, means associated with said second leg former mechanism for heating said legs during manipulating thereof and means to effect the actuation of said mechanisms in proper synchronism.

4. Apparatus for uniformly bending the legs of a coiled filament which extends from the central barrel portions thereof, at angles to the barrel axis, to adapt said filament for use in automatic mounting machines, comprising the combination of a head to hold said filament and carry it along a definite path to a plurality of work stations; a coil feeding mechanism at one of said work stations for feeding such filaments one by one to a head, so that the barrel thereof is gripped and the legs project outwardly therefrom; a first leg former mechanism at a succeeding work station for bending the legs of a coil held by a head into a required shape and position, in planes vertical to the axis of the coil barrel, means associated with said first leg former mechanism for heating said legs during bending thereof; a second leg former mechanism at another work station for manipulating the legs into a required shape and position in directions parallel to the axis of the coil barrel, means associated with said second leg former mechanism for heating said legs during manipulating thereof; said second leg former mechanism comprising base brackets numbers one and two upstanding therefrom, a slide member mounted for vertical reciprocation in each bracket, bracket number one having a horizontal top shelf portion extending toward and at an elevation higher than bracket number two, a third slide member in said top shelf portion for horizontal reciprocation toward and away from bracket number two, a rack carried by each of the two first-mentioned slide members, two pinions one disposed in engagement with one rack and the other in engagement with the other rack, a shaft on which said pinions are mounted for turning about a common axis, means for turning said pinions to move said racks and slide them in opposite directions, a cam carried by the upper portion of the member vertically slidable in bracket number one and engaging a portion of the third slide member to move it to position over the slide member in bracket number two, spring means biasing the third slide member to a position over the bracket number one slide and into engagement with said cam, forming blocks one carried on each of two horizontal shafts disposed below and parallel to the line of movement of the third slide member, pinions on said shafts in engagement with one another to cause them to simultaneously turn in opposite directions, forming blocks carried by said shafts and movable therewith to shape the coil legs when in close position, means for operating said forming-block-carrying shafts comprising cams carried by the slide of bracket number two and engaging cams on one of the forming blocks carrying shafts for turning the latter and moving said forming blocks toward and away from one another, an intermediate forming block carried by the third slide member and caused by the pinion-cam connection to move to a position between said forming blocks as they come together; to thereby horizontally bend the coil legs, which respectively lie between the intermediate block and those on opposite sides thereof, into a desired configuration, and means for applying electrical heating current from said forming blocks to pass through said legs and coil when said blocks are together about said legs, in order to heat the latter to a setting temperature when formed by said blocks, and means to effect the actuation of said mechanisms in proper synchronism.

5. Apparatus for uniformly bending the legs of a coiled filament which extend from the central barrel thereof to adapt said filament for use in an automatic mounting machine, comprising the combination of a head for gripping the central barrel of a filament with the legs projecting outwardly therefrom and operable to carry it along a definite path of movement to a plurality of work stations, a first leg former mechanism at one work station for bending such legs transverse to the longitudinal axis of the central barrel and for positioning such bent legs in the same plane, means connected to said first leg former mechanism for heating said legs during the bending and positioning thereof, a second leg former mechanism at another work station for bending the end of each of the projecting legs outwardly from the longitudinal axis of the leg, means connected to said second leg former mechanism for heating such legs during the bending thereof, and means to effect the actuation of said mechanism in proper synchronism.

6. Apparatus for uniformly bending the legs of a coiled filament which extend from the central barrel thereof to adapt said filament for use in an automatic mounting machine, comprising the combination of a head for gripping the central barrel of a filament with the legs projecting outwardly therefrom and operable to carry it along a definite path of movement to a plurality of work stations, a first leg former mechanism at one work station for bending such legs transverse to the longitudinal axis of the central barrel and for positioning such bent legs in the same plane, means connected to said first leg former mechanism for heating said legs during the bending and positioning thereof, a second leg former mechanism at another work station for bending the end of each of the projecting legs outwardly from the longitudinal axis of the leg, means connected to said second leg former mechanism for heating such legs during the bending thereof, a third leg former mechanism at a succeeding work station for crimping the portion of each bent leg adjacent the central barrel, means connected to said third leg former mechanism for heating such portions during the crimping thereof, and means to effect the actuation of said mechanisms in proper synchronism.

References Cited in the file of this patent

UNITED STATES PATENTS

| | | |
|---|---|---|
| 1,419,153 | Lederer | June 13, 1922 |
| 1,733,882 | Illingworth | Oct. 29, 1929 |
| 1,821,894 | Otaka | Sept. 1, 1931 |
| 1,907,532 | Flaws | May 9, 1933 |
| 1,920,630 | Conn | Aug. 1, 1933 |
| 2,297,950 | Flaws | Oct. 6, 1942 |
| 2,372,082 | Iden | Mar. 20, 1945 |
| 2,456,222 | Stutl | Dec. 14, 1948 |
| 2,575,771 | Russell | Nov. 20, 1951 |
| 2,640,509 | Kulberg | June 2, 1953 |
| 2,650,634 | Young | Sept. 1, 1953 |
| 2,781,796 | Dilts | Feb. 19, 1957 |